Feb. 23, 1954 M. H. FIEST 2,670,017
TENSIONING MEANS FOR POWER-OPERATED CHAIN SAWS
Filed Nov. 29, 1948 4 Sheets-Sheet 1
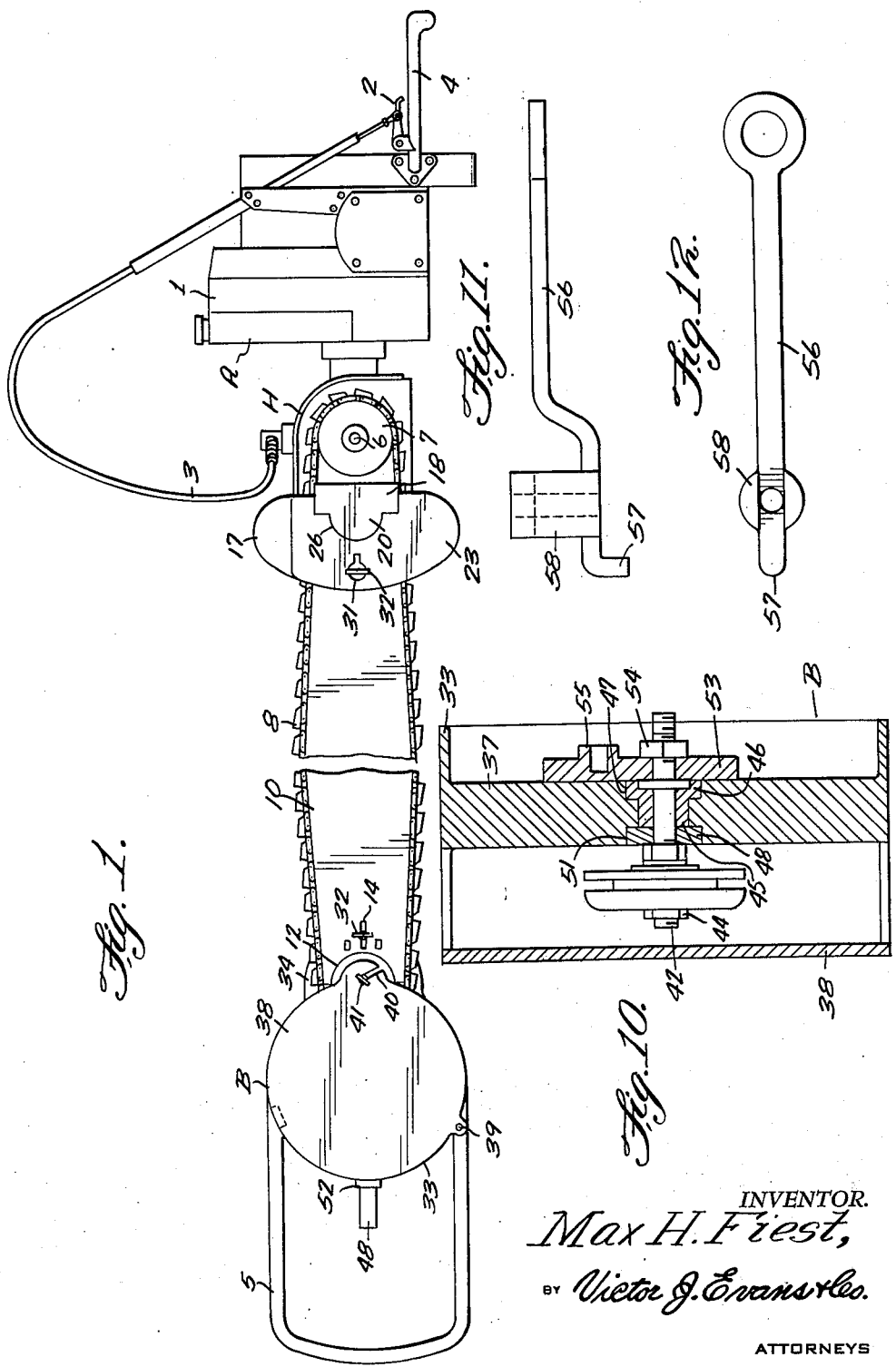
INVENTOR.
Max H. Fiest,
BY Victor J. Evans & Co.
ATTORNEYS Feb. 23, 1954　　　　M. H. FIEST　　　2,670,017
TENSIONING MEANS FOR POWER-OPERATED CHAIN SAWS
Filed Nov. 29, 1948　　　　　　　　　　4 Sheets-Sheet 2
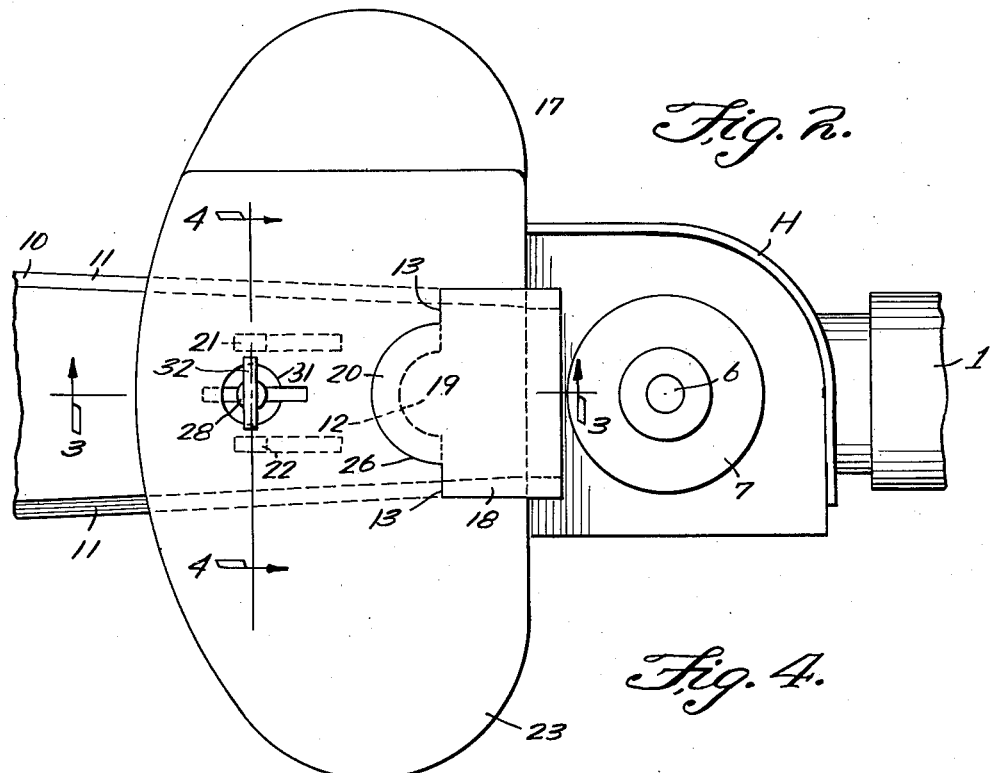
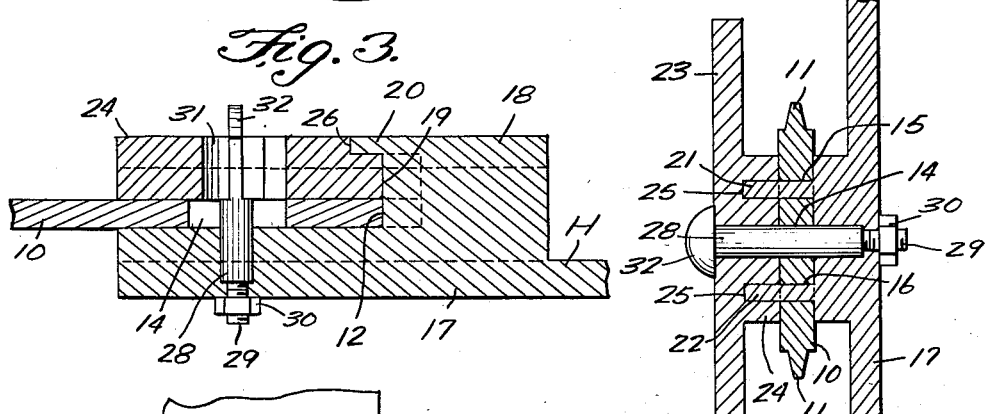
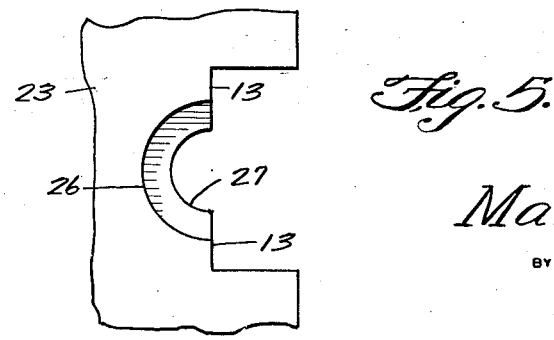
INVENTOR.
Max H. Fiest,
BY Victor J. Evans & Co.
ATTORNEYS

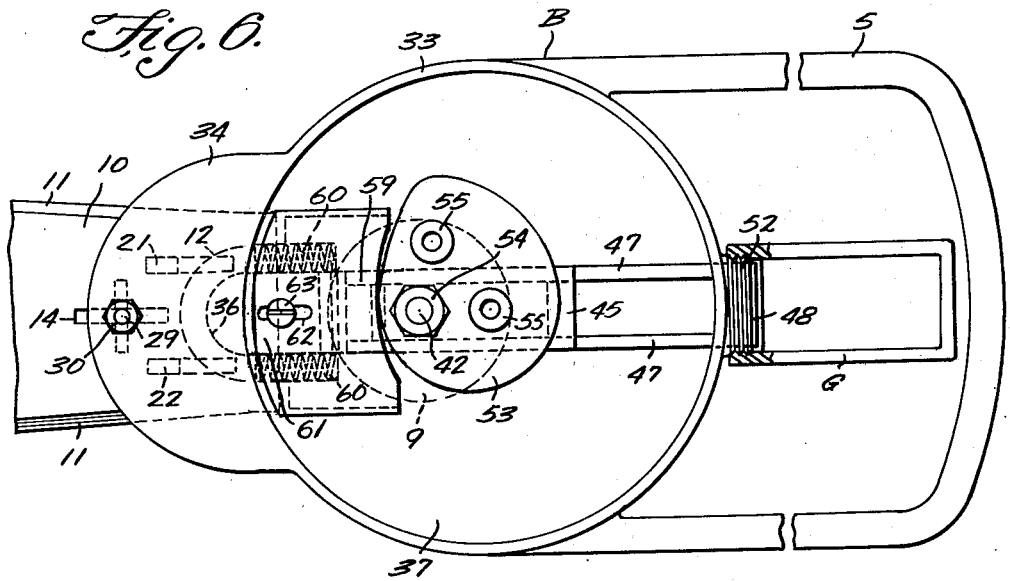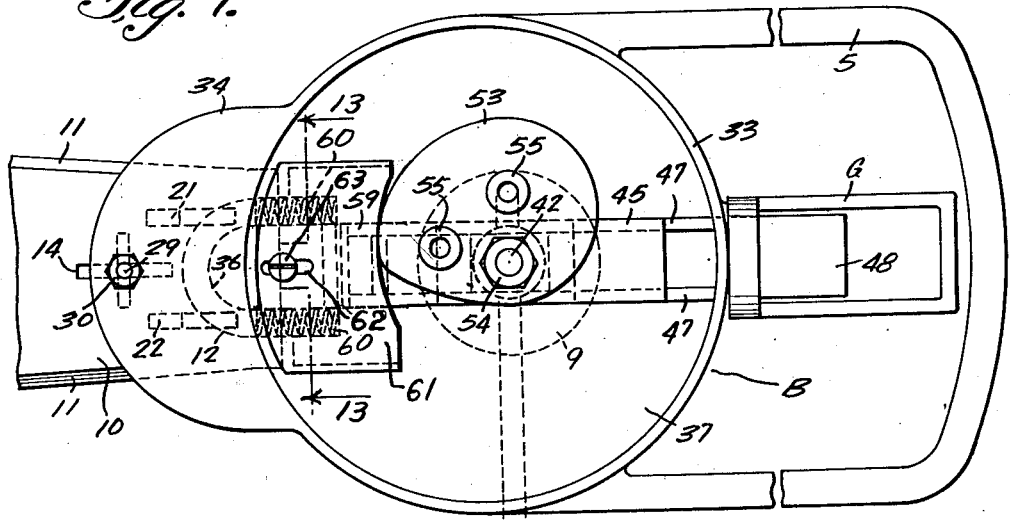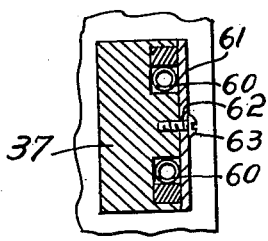

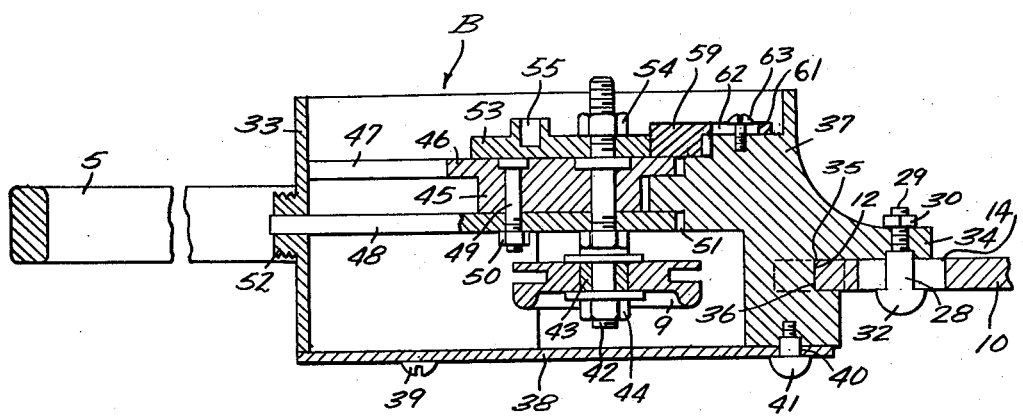
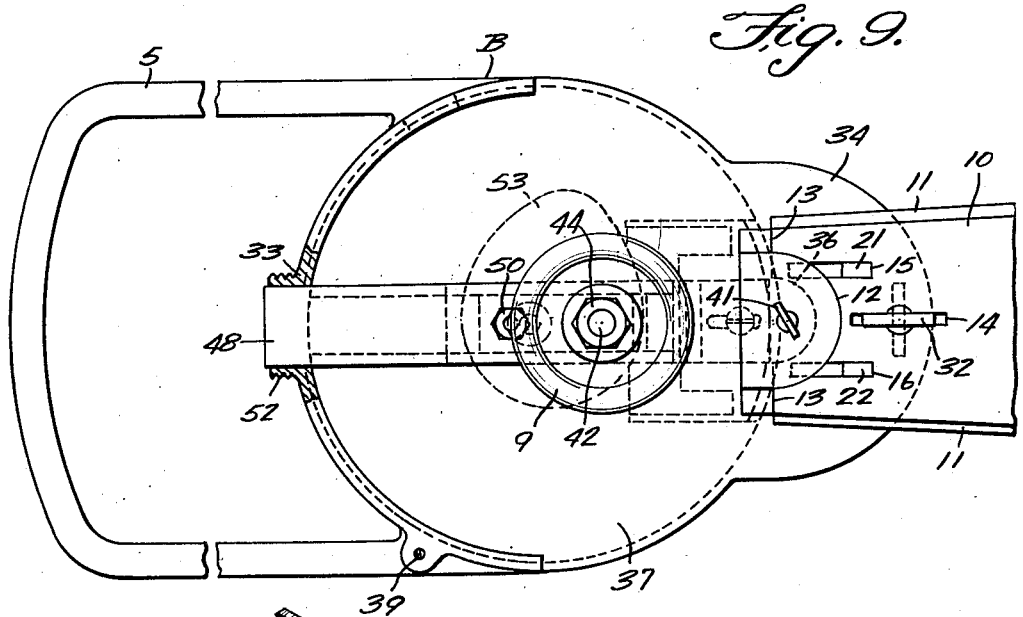
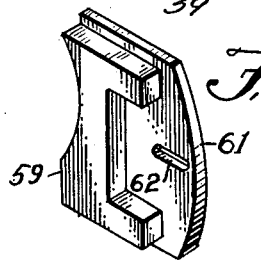

Patented Feb. 23, 1954

2,670,017

UNITED STATES PATENT OFFICE

2,670,017

TENSIONING MEANS FOR POWER-OPERATED CHAIN SAWS

Max H. Fiest, Toutle, Wash.

Application November 29, 1948, Serial No. 62,437

1 Claim. (Cl. 143—32)

This invention relates to chain saw machines in the general class of woodsawing, and more specifically to improvements in power operated chain saws of the two-man type designed especially for cutting down trees, timber, and other heavy field work. This application for patent is a continuation in part of the invention described and claimed in my pending application for Patent Ser. No. 763,213, filed July 24, 1947, Power Operated Chain Saw, now abandoned. The primary purpose of the invention is to enhance the efficiency of the saw machine and increase its usefulness by improvements embodied in the means for adjustably mounting the saw blade or guide rail in the headstock and tailstock; and in novel tensioning means mounted in the tailstock for the chain saw. These devices and appliances include a minimum number of parts that may be manipulated with facility in assembling, repairing, and replacing the parts, thus reducing the expenditure of time and labor to a minimum, and insuring a smooth operating and durable sawing machine.

The invention consists in certain novel features of construction and combination and arrangements of parts as will hereinafter be described and more particularly pointed out in the appended claim. In the accompanying drawings I have illustrated a complete example of a physical embodiment of my invention in which the parts are combined and arranged in accord with one mode I have devised for the practical application of the principles of my invention.

Figure 1 is a side elevation, partly broken away, of a chain saw machine in which my improvements are embodied.

Figure 2 is an enlarged detail side view at the head stock end of the sawing machine; Figure 3 is a horizontal longitudinal sectional view at line 3—3 of Fig. 1; and Figure 4 is a transverse vertical sectional view at line 4—4 of Fig. 1.

Figure 5 is a fragmentary view of a head plate of the headstock. Figures 6 and 7 are views in elevation of the tailstock and tensioning means.

Figure 8 is a horizontal longitudinal sectional view through the tailstock; and Figure 9 is a face view with the cover removed.

Figure 10 is a transverse vertical sectional view through the tailstock; Figures 11 and 12 show a hand tool or wrench for use in manipulating parts of the tailstock; Fig. 13 is a detailed sectional view on the line 13—13. Fig. 7 and Fig. 14 is a perspective view of the cam plate and the retaining plate therefor.

The operating end or headstock of the sawing machine is indicated as a whole by the letter A and the tailstock with its tensioning means is indicated by the letter B. A motor 1, of the gasoline type or other suitable type forms part of the headstock, and a usual hand control lever 2 is flexibly connected as at 3 to the transmission mechanism in housing H. The headstock is equipped with a pair of spaced handles 4 for manipulating one end of the sawing machine, and the hand lever 2 is mounted on one of the handles for ready access by one of the two operators of the saw.

In addition to the handles 4 of the headstock, the tailstock end of the machine is equipped with a U-shaped yoke forming a handle 5 for use by the other operator.

Power is transmitted from the motor 1 to a clutch mechanism within the housing H, and a drive shaft 6 journaled in the housing, and thence to a grooved pulley 7 for driving the saw 8. The flexible and endless chain saw also passes around a driven pulley 9 mounted in the tailstock, and between these two pulleys the chain saw is guided and supported by means of a flat double tapered blade or guide rail 10 having an exterior guiding wedge or bead 11 for the saw, and the rail unites the headstock with the tailstock.

The interchangeable guide rail which rigidly unites the headstock and the tailstock may be turned end for end, and reversed or turned on its longitudinal axis to facilitate the assembling, and dismantling of parts, and to insure durability in wear of the rail as a guide and support for the chain saw. For this purpose each of the opposite ends of the rail terminates in a rounded concave or semicircular centering seat 12 and two spaced upright alined and squared shoulders 13, and adjoining the ends are milled a central longitudinally extending keyhole slot 14 and two shorter parallel slots 15 and 16.

For locking one end of the guide rail to the headstock with a quick detachable fastener I utilize a vertically arranged base plate 17, rigid with the housing H, and provided with a lateral head 18 that is formed with a convex centering lug 19 that coacts with the concave seat 12 of the rail, and an overhanging flange 20 having a semi-circular free edge. The plate is also fashioned with a pair of spaced lateral lugs 21, 22, over which the slots 15 and 16 of the rail end are slipped as the rail is set in position for locking the headstock and rail.

For coaction with the head plate and the rail, a detachable locking plate 23 is fashioned with an integral locking block 24 having spaced sockets 25 to receive the ends of the lugs 21 and 22 of the head plate, and the locking head is also formed with a circular undercut groove 26 to permit the block or head to be slipped under the flange 20 of the attaching head 18, and an additional concave seat 27 that fits around the centering lug 19 of the head 18.

For clamping together and locking together this attaching assembly for the rail and headstock, a single bolt 28 is mounted with its reduced threaded end 29 in the head plate 17 and fastened by a lock nut 30. This bolt passes through the slot 14 of the rail and also through a keyhole slot 31 in the block 24, and the bolt is fashioned with a flat semi-circular head 32 of ample size to span the circular portion of the keyhole slot for locking the parts together. If and when necessary, these parts may be detached by first turning and loosening the lock nut 30, after which the flat head 32 of the bolt may be turned to register with the longitudinal extension of the keyhole slot, to permit removal of the locking block, and subsequent disengagement of the rail with the attaching head of the plate 17.

Both ends of the rail are of duplicate construction and arrangement, and both ends of the rail are equipped with a single locking bolt that may be employed at either end for locking the rail to the headstock or to the tailstock.

The tailstock B includes a circular open end housing 33 integral with the yoke shaped handle 5, and the inner end of the housing is fashioned with an exterior attaching flange 34 to which the rail is attached by one of the locking bolts and nut, and a groove 35 forming a convex centering seat or lug 36 to receive the concave seat 12 of the end of the rail.

For mounting and tensioning the driven pulley 9 of the endless chain saw in the open end housing, the housing is fashioned with an inner integral supporting head 37, and one side of the open end housing is closed by means of a circular cover plate 38 pivoted at 39 to the rim of the housing, and provided with an arcuate slot 40 for the fastening or clamp bolt 41.

The grooved driven pulley 9 is journaled upon a spindle 42 by means of a bearing bushing or sleeve 43, and the pulley is retained by a lock nut 44 threaded on the end of the spindle assembly which is resiliently mounted and cam actuated for tensioning the saw.

The stud bolt or spindle 42 is mounted transversely of the tailstock in a slide head or slide block 45 having flanges 46 that slide in centrally arranged and longitudinally extending grooves 47 in one face of the housing head 37 and within the housing, and a flat guide arm 48 is fastened to the head by bolt 49 and nut 50, which coact with the spindle in rigidly uniting the arm and head of the slide.

The arm 48 is also slidably mounted and guided in a groove 51 of the head 37, and the free end of the arm projects through a tubular boss 52 integral with the circular wall of the housing; a tubular guard G being mounted on the externally threaded tubular boss for protecting the end of the slide arm.

For longitudinally adjusting the driven pulley through movement of the slide head and arm, a cam disk or eccentric plate 53 is rotatably mounted upon the spindle 42 and retained by nut 54 threaded on the end of the spindle, and the cam disk is provided with two socket lugs, as 55, 55, for selective use by a hand tool or wrench 56 having an end pin 57 for coaction with a selective socket lug. The wrench also has a nut socket 58 to fit over the nut 54 of the cam disk, and as indicated by dotted lines in Fig. 7 the hand tool may be attached to the cam disk or eccentric for turning the cam to the different positions in Figs. 6 and 7, after which movements the wrench is of course removed.

For tensioning purposes the cam disk or eccentric plate bears against and coacts with a two-arm cam plate 59 that is slidably mounted upon one face of the housing head 37 and the arms of the cam plate in cooperation with the housing 33 and housing head 37 provide a pair of parallel slots in which are enclosed a pair of coiled springs 60 that are interposed between the arms of the cam plate and the head 37. A retaining plate 61 for the cam plate and springs is provided with a slot 62, and a headed screw 63 passing through the slot is threaded into the head 37 to retain the resiliently mounted cam plate see Figs. 13 and 14.

For shortening the span between the driving pulley 7 and the driven pulley 9, the latter is moved to position in Fig. 7 to permit mounting or dismounting of the chain saw between the pulleys, and to tension the saw, the cam disk or eccentric, by means of the hand tool, is turned to position of Fig. 6 by means of which movement the chain saw is extended and held resiliently under tension.

Having thus fully described my invention, what I claim as new and desire to secure by Letters Patent is:

In tensioning mechanism for a chain saw machine, the combination with a circular housing, a slide head movable therein, an arm rigid with the head, means within the head for guiding said head and arm, a spindle carried by the slide head, and a driven chain-supporting wheel journaled on the spindle, of a cam disk eccentrically mounted on the spindle, means on the disk for attaching a manually operated tool, a two armed cam plate mounted on the circular housing and forming with said circular housing a pair of parallel slots, and a pair of coiled springs interposed between the cam plate and the circular housing within said slots.

MAX H. FIEST.

References Cited in the file of this patent

UNITED STATES PATENTS

| Number | Name | Date |
|---|---|---|
| 712,588 | Plopper | Nov. 4, 1902 |
| 780,467 | Bens | Jan. 17, 1905 |
| 1,913,040 | Pierson | June 6, 1933 |
| 2,101,343 | Ponton | Dec. 7, 1937 |
| 2,109,702 | Lange | Mar. 1, 1938 |
| 2,326,854 | Hassler | Aug. 17, 1943 |
| 2,375,438 | Regenhardt | May 8, 1945 |
| 2,380,348 | Wagstaff | July 10, 1945 |
| 2,444,132 | Gordon et al. | June 29, 1948 |
| 2,473,728 | Rutledge | June 21, 1949 |